(12) United States Patent
Barbieri et al.

(10) Patent No.: US 8,711,040 B2
(45) Date of Patent: Apr. 29, 2014

(54) WIRELESS NETWORK DEVICE INCLUDING A POLARIZATION AND SPATIAL DIVERSITY ANTENNA SYSTEM

(76) Inventors: Daniele Barbieri, Tortona (IT); Vincenzo Boffa, Milan (IT); Simone Germani, Milan (IT); Fabrizio Ricci, Milan (IT); Marco Storto, Milan (IT)

( * ) Notice: Subject to any disclaimer, the term of this patent is extended or adjusted under 35 U.S.C. 154(b) by 715 days.

(21) Appl. No.: 12/451,842

(22) PCT Filed: Jun. 4, 2007

(86) PCT No.: PCT/EP2007/004932
§ 371 (c)(1),
(2), (4) Date: Mar. 29, 2010

(87) PCT Pub. No.: WO2008/148404
PCT Pub. Date: Dec. 11, 2008

(65) Prior Publication Data
US 2010/0182206 A1    Jul. 22, 2010

(51) Int. Cl.
*H01Q 1/24* (2006.01)
(52) U.S. Cl.
USPC ............................ 343/702; 343/793; 343/893
(58) Field of Classification Search
USPC .................................... 343/702, 700 MS, 793
See application file for complete search history.

(56) References Cited

U.S. PATENT DOCUMENTS

| | | | |
|---|---|---|---|
| 6,154,177 A * | 11/2000 | Saito et al. | ..................... 343/702 |
| 6,342,868 B1 | 1/2002 | Tsai et al. | |
| 6,693,603 B1 | 2/2004 | Smith et al. | |
| 2002/0175864 A1 | 11/2002 | Fang et al. | |
| 2003/0058171 A1 | 3/2003 | Umehara et al. | |
| 2003/0146876 A1 | 8/2003 | Greer et al. | |
| 2004/0207557 A1* | 10/2004 | Chen et al. | ..................... 343/702 |
| 2004/0227677 A1* | 11/2004 | Asano et al. | .................. 343/702 |

FOREIGN PATENT DOCUMENTS

| | | |
|---|---|---|
| EP | 0 691 703 B1 | 1/1999 |
| WO | WO 2006/003416 A2 | 1/2006 |

OTHER PUBLICATIONS

Kar, et al., "Investigations on Polarization Schemes for use in Wireless Environments", Proc. SPIE, vol. 4740, pp. 160-167, (2002).

(Continued)

*Primary Examiner* — Dieu H Duong
(74) *Attorney, Agent, or Firm* — Finnegan, Henderson, Farabow, Garrett & Dunner, L.L.P.

(57) ABSTRACT

A wireless access gateway for communication of wave signals at radio frequencies within a frequency band, includes an access gateway enclosed in a housing including a bottom wall and a main circuit board overlying the bottom wall and having an upper surface substantially parallel to the bottom wall. The gateway is equipped with an antenna system including at least two antennas: a first linearly polarized antenna for propagating a first wave signal along a first polarization axis including a first radiating element extending along a first longitudinal axis lying on a first plane substantially parallel to the base plane, and a second linearly polarized antenna for propagating a second wave signal along a second polarization axis oriented perpendicularly to the first polarization axis, the second antenna including a second radiating element extending along a second longitudinal axis lying on a second plane oriented perpendicularly to the first plane. The first and second antennas are positioned relative to each other at a distance of at least $\lambda/2$, where $\lambda$ is the wavelength corresponding to a radio frequency within the frequency band.

33 Claims, 11 Drawing Sheets

(56) References Cited

OTHER PUBLICATIONS

Yeap, et al., "Integrated diversity antenna for laptop and PDA terminal in a MIMO system", IEE Proc.—Microw. Antennas Propag., vol. 152, No. 6, pp. 495-504, (2005).

Chuang, et al., "A 2.4 GHz Polarization-diversity Planar Printed Dipole Antenna for WLAN and Wireless Communication Applications", Microwave Journal, vol. 45, pp. 1-7, (2002).

International Search Report from European Patent Office for International Application No. PCT/EP2007/004932 mailed May 21, 2008.

* cited by examiner

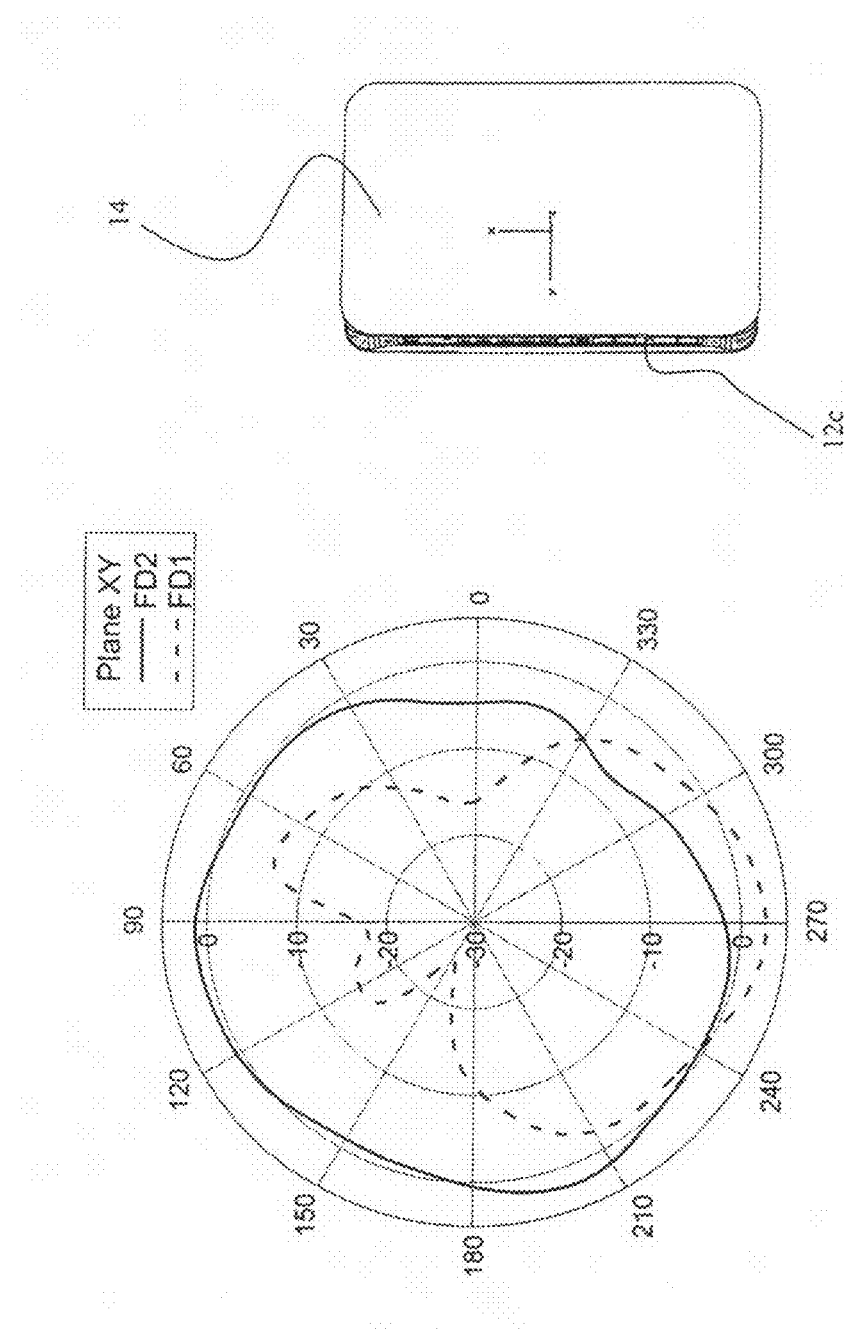

WIRELESS NETWORK DEVICE INCLUDING A POLARIZATION AND SPATIAL DIVERSITY ANTENNA SYSTEM

CROSS REFERENCE TO RELATED APPLICATION

This application is a national phase application based on PCT/EP2007/004932, filed Jun. 4, 2007, the content of which is incorporated herein by reference.

FIELD OF THE INVENTION

The present invention relates to a wireless network device and in particular to a device functioning as access point between one or more mobile terminals and a wired network.

BACKGROUND OF THE INVENTION

Broadband access technologies have allowed service providers to expand their content and service offerings to both business and home users. For example, a user may subscribe to multiple services or applications, such as voice service, Internet access service, video streaming, a gaming service, etc. from one or more service providers. These services and/or applications available through a private or public data network (e.g., the Internet) may be delivered over a single network connection, such as a Digital Subscriber Line (DSL) line.

Wireless local area networks (WLANs), like their wired counterparts, are being developed to provide high bandwidth to users in a limited geographical area. They are being developed as an alternative to the high installation and maintenance costs incurred by addition, deletion or modification experienced in wired infrastructures, thereby targeting the typical markets for WLANs to consumer and small business segments.

Currently, the most widely implemented WLAN standard is the IEEE 802.11 family of standards, which has been released with different specifications. In particular, the 802.11b specification, also known as Wi-Fi, operates in the 2.4-GHz frequency range and uses direct sequence spread spectrum technology, whereas the 802.11g specification operates in the 2.4-GHz frequency range and uses orthogonal frequency division multiplexing (OFDM) technology. On the other hand, the 802.11a specification operates in the 5.15-5.35 GHz and 5.725-5.925 GHz.

WLANs operate by employing wireless access points (or access gateways) that provide users having wireless "client" devices in proximity to the access point, with access to various types of data networks such as an Ethernet network or the Internet. The wireless access points include at least a radio that typically operates according to one of the standards specified in different sections of the IEEE 802.11 specification. Generally, radios in the access points communicate with client devices by utilizing omni-directional antennas that allow the radios to communicate, i.e., to transmit and receive data, with client devices in any direction. The access points are then connected (by hardwired connections) to a data network system that completes the access of the client device to the data network.

Wireless gateways are then usually implemented as the final link between the existing wired network and a group of clients, giving these users wireless access to the full resources and services of the data network across a building.

US patent application No. 2002/0175864 discloses an electronic device for bridging a mobile device to a wired network comprising an antenna pair consisting of two mutually orthogonal slot antennas formed on a metallic strip and sharing a common portion of the strip as the grounding unit. The antenna pair can be concealed inside the electronic device.

The main causes of performance degradation in wireless communications are multipath fading, polarization mismatch and the co-channel interference. One technique used to increase signal efficiency is Multiple Input Multiple Output ("MIMO"). MIMO techniques use a plurality of antennas coupled to a signal processing chipset for the simultaneous transmission and/or reception of multiple signals. MIMO provides antenna diversity against undesirable path effects and improves communication channel capacity. As transmission paths between the transmit antennas and receive antennas are generally linearly independent, the probability of successful transmission of signal to a client generally increases in proportion to the number of antennas.

In wireless communication employing MIMO, two or more unique data streams are transmitted and received through one radio channel whereby two or more times the data rate per channel are delivered. More than one coherent radio up-converter and antenna are used to transmit the multiple signals, and more than one coherent radio down-converter and antenna receive the multiple signals. Peak throughput in MIMO systems increases by a factor equal to the number of data streams transmitted (or received) in the channel. Because multiple signals are being transmitted (or received) from a different radio and antenna, MIMO signals are often called "multi-dimensional" signals.

WO patent application No. 2006/003416 describes a wireless network device having orthogonally polarized antennas arranged to provide transmit and/or receive polarization diversity. The antennas may be integrated within or mounted on a housing of the device so that they do not physically project outside the housing. The device may have two such antennas, arranged orthogonally on the same or different faces of the housing.

MIMO techniques can work in transmission diversity and/or reception diversity. According to the common terminology, a MIMO technique works in both transmission and reception diversity. A system which uses multiple antennas at the transmitter and a single antenna at the receiver is named as Multiple Input Single Output (MISO), whereas a system using a single antenna at the transmitter and multiple antennas at the receiver is named as Single Input Multiple Output (SIMO). In reception diversity (i.e., MIMO and SIMO techniques), the responses of the multiple antennas at the receiver side are combined.

As previously mentioned, the diversity works well when fluctuations due to multipath fading of the received signal at the multiple receiver antennas are independent of each other. Antenna diversity techniques can take various forms, for example, space, polarization, frequency, or angle diversity. In space diversity scheme, the diversity antennas have to be placed apart in various spacings.

A review of polarization diversity schemes in wireless communication is reported in "*Investigations on Polarization Schemes for use in Wireless Environments*", by M. Kar and P. Wahid, published in the Proceedings of SPIE, vol. 4740 (2002), pages 160-167.

S. B. Yeap at al. in "*Integrated diversity antenna for laptop and PDA in a MIMO system*", published in IEE Proc.-Microw. Antennas Propag., vol. 152, no. 6 (2005), introduces a design of double-folded dipole antenna filled with a slab of dielectric material. According to the authors, the antennas can be spatially placed close to each other (less than $\lambda/2$), while implementing polarization diversity. A laptop design is described in which two different orientations of the dielectric loaded double-folded dipole are implemented on the screen of the laptop.

A polarization diversity antenna is described in the article "*A 2.4 GHz Polarization-diversity Planar Printed Dipole Antenna for WLAN and Wireless Communication Applications*", by H.-R. Chuang et al., published in Microwave Journal, vol. 45, pages 50-63 (2002), in which two orthogonal printed dipole antennas, for vertical and horizontal polarization, respectively, are combined and fabricated on a PCB substrate.

SUMMARY OF THE INVENTION

In indoor applications, the wireless access gateway generally includes a housing which accommodates wireless access point circuitry and electrical connectors for direct plug-in into an Ethernet or telephone jacks for establishing a network communication, e.g., to the PSTN (Public Switched Telephone Network) line. Usually, the gateway has two external separate antennas pointing outward that can be manually adjusted by the user. This allows the communication quality of the antennas to be tuned according to the various ambient conditions.

The Applicant has observed that generally external antennas have good performance in term of radiation efficiency, matching, bandwidth and gain. In that case, RF circuits of the electronic equipment and the electronic equipment casing on which the antennas are mounted do not significantly affect antenna performance. Nevertheless, external antennas increase the encumbrance of the gateway and often do not harmonize with the gateway casing leading to a detrimental impact on the customer perception.

On the other hand, internal antennas, i.e., antennas that are mounted inside the housing of the electronic device functioning as an access point, even if they improve the packaging style of the electronic equipment casing, have worse performance, in terms of radiation diagram, gain, and radiation efficiency, with respect to external antennas, since they are affected by the presence of other electronic components of the device. In addition, internally mounted antennas have a size constraint due to the dimensions and shape of the electronic equipment package.

In order to improve signal efficiency, it is desirable that wireless communication access point devices work with transmission and/or reception diversity and therefore to devise an antenna system in which the antennas provide substantially uncorrelated wave signals.

The Applicant has observed that there is a need of wireless access gateways being provided with internal antennas while providing a substantially omni-directional coverage. For the purpose of the present invention with the term "substantially omni-directional" we mean a radiation pattern whose peak to peak ripple is limited to few dB in a main plane, typically within 10 dB and preferably not larger than 5 dB across 90% of a 360° angle in the main plane.

Moreover, the Applicant has faced the problem of maintaining the communication quality while making possible for the final user to install the gateway in the indoor environment in different positions. In particular, he has noted that a substantial omni-directional coverage should be realized in different mounting positions of the access gateway.

The Applicant has considered that using linearly polarized antennas in the antenna system of the AG is particularly advantageous since they generally guarantee a relatively high uncorrelation between the antennas when polarization diversity is implemented.

The Applicant has found that an AG comprising an antenna system having at least two linearly polarized antennas with orthogonal polarization and having a radiating element lying on perpendicular planes is able to maintain communication quality when the AG is placed in different operating positions. At least one of the two antennas is arranged on a plane that is parallel to the bottom wall of the housing of the AG, the bottom wall being the base of the AG when horizontally arranged on a supporting surface. The access gateway includes a main circuit board overlying the bottom wall and having an upper surface being substantially parallel to the bottom wall.

The Applicant has found that the main circuit board acts as reflecting surface that reflects the radiation field emitted by the antennas and that it is in particular advisable to dispose the antenna arranged on a plane that is parallel to the bottom wall in the proximity of the plane defined by the upper surface of the main circuit board in order to improve radiation gain of the antenna system since distortions due to reflections from the main circuit board are greatly reduced.

Advantageously, each of the antennas of the antenna system is a planar antenna since it allows the configuration of the antenna assembly with a certain degree of freedom and facilitates the integration of the antennas in the housing.

Preferably, each of the antennas of the antenna system can produce a radiation pattern that is substantially omni-directional with respect to a predetermined plane.

Preferably, each of the antennas in the antenna system of the present invention is a dipole antenna providing a radiation pattern substantially omni-directional in a plane orthogonal to its dipole axis. More preferably, the antennas are printed dipole antennas.

In an aspect of the present invention, there is provided a wireless access gateway (1; 30) for communication of wave signals at radio frequencies within a frequency band, the gateway being enclosed in a housing (2) including a bottom wall (13) defining a base plane and comprising:

a main circuit board (7) within the housing (2) overlying said bottom wall (13) and having an upper surface and a lower surface, opposite to each other, said lower surface facing the bottom wall and said upper surface being substantially parallel to the base plane, and an antenna system arranged in the housing (2) and comprising:

a first linearly polarized antenna (4; 22) for propagating a first wave signal along a first polarization axis, the first antenna comprising a first radiating element extending along a first longitudinal axis in a first plane substantially parallel to the base plane, and a second linearly polarized antenna (5; 23) for propagating a second wave signal along a second polarization axis oriented perpendicularly to the first polarization axis, the second antenna comprising a second radiating element extending along a second longitudinal axis in a second plane oriented perpendicularly to the first plane, wherein the first and second antennas are positioned relative to each other at a distance of at least $\lambda/2$, where $\lambda$ is the wavelength corresponding to a radio frequency within the frequency band.

Other embodiments of the wireless access gateway of the present invention are set forth below.

The first antenna (4; 22) may be substantially planar with the first radiating element disposed on an upper surface of a first planar substrate, said upper surface defining the first plane, and the second antenna (5; 23) may be substantially planar with the second radiating element disposed on an upper surface of a second planar substrate, said upper surface defining the second plane so that the first and second planar substrates are oriented perpendicularly one to another.

The first and second longitudinal axes may correspond to the first and second polarization axes, respectively.

The first and second antennas may be positioned relative to each other at a distance of at least $2/3\lambda$.

The first plane of the first antenna (4; 22) may be placed at a distance in a direction perpendicular to the first plane of not more than $\lambda/4$ from the upper surface of the main circuit board (7); wherein said distance of the first plane from the upper surface of the main circuit board (7) may be not more than $\lambda/8$; or wherein said distance of the first plane from the upper surface of the main circuit board (7) may be not more than 5 mm.

The first and the second antennas may be electrically connected to the main circuit board (7).

The housing (2) may comprise a peripheral enclosure (12) formed by opposed side walls (12a, 12b), a front wall (12d) and a rear wall (12c), wherein at least one of the opposed side walls (12a) may be substantially perpendicular to the bottom wall (13) and the second longitudinal axis lying on the second plane may be arranged substantially parallel to the at least one of said side walls (12a); or the gateway may further comprise at least one connector (8a, 8b, 16) mounted in the housing (2) and accessible from the exterior of the access gateway through the rear wall (12c); wherein each of the first and second antennas may be spatially separated from the outer edge of the at least one connector (8a, 8b, 16) at a distance in the direction of the first longitudinal axis of at least $\lambda/2$; or wherein each of the first and second antennas may be spatially separated from the outer edge of the at least one connector (8a, 8b, 16) at a distance in the direction of the first longitudinal axis of at least $\lambda$.

The antenna system may comprise two and not more than two antennas (4, 5).

A radiation pattern of each of the first and second antennas may be substantially omni-directional in a main plane orthogonal to the longitudinal axis of each of the first and second antennas, respectively.

The first and second planar substrates may be made of dielectric material, wherein the first and second antennas may be printed antennas having the first radiating element printed on the first planar substrate and the second radiating element printed on the second planar substrate.

Each of the first and second antennas may be a dipole antenna, wherein each of the first (4; 22) and second antennas (5; 23) may have a dipole center disposed substantially centrally of the radiating element along the longitudinal axis, the dipole center of the first antenna being spatially separated from the dipole center of the second antenna at a distance of not more than $\lambda/4$ along the first longitudinal axis.

The antenna system may further comprise a third linearly polarized antenna (20) for propagating a third wave signal along a third polarization axis oriented perpendicularly to the first and second polarization axes, the third antenna comprising a third radiating element extending along a third longitudinal axis lying on a third plane, wherein the third plane may be oriented substantially parallel to the base plane of the bottom wall (13) of the housing (2), or wherein the third plane may be placed at a distance in a direction perpendicular to the third plane of not more than $\lambda/4$ from the upper surface of the main circuit board (7), wherein said distance of the third plane from the upper surface of the main circuit board (7) may be not more than $\lambda 8$, or wherein said distance of the third plane from the upper surface of the main circuit board (7) may be not more than 5 mm.

The third antenna may be substantially planar with the third radiating element disposed on an upper surface of a third planar substrate, said upper surface defining the third plane, wherein the third planar substrate may be made of dielectric material, or wherein the third antenna may be a printed antenna having the third radiating element printed on the third planar substrate.

The third plane may be oriented substantially in co-planarity with the first plane on which the first radiating element of the first antenna (22) lies.

The third antenna (20) and the first antenna (22) may be positioned relative to each other at a distance of at least 8/2 and the third antenna (20) and the second antenna (23) may be positioned relative to each other at a distance of at least $\lambda/2$, wherein the first antenna (22) and the second antenna (23) may be positioned relative to each other at a distance of at least $\lambda$.

A radiation pattern of the third antenna may be substantially omni-directional in a main plane orthogonal to the third longitudinal axis, and the third antenna may be a dipole antenna.

The third longitudinal axis may correspond to the third polarization axis, and the antenna system may comprise three and not more than three antennas (20, 22, 23).

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein:

FIG. 8a show the measured far field gain patterns in an xy plane of the antenna system of FIGS. 1-3. The orientation of the gateway during measurements of the pattern of FIG. 8a is schematically illustrated in FIG. 8b.

DETAILED DESCRIPTION

Figure 1:
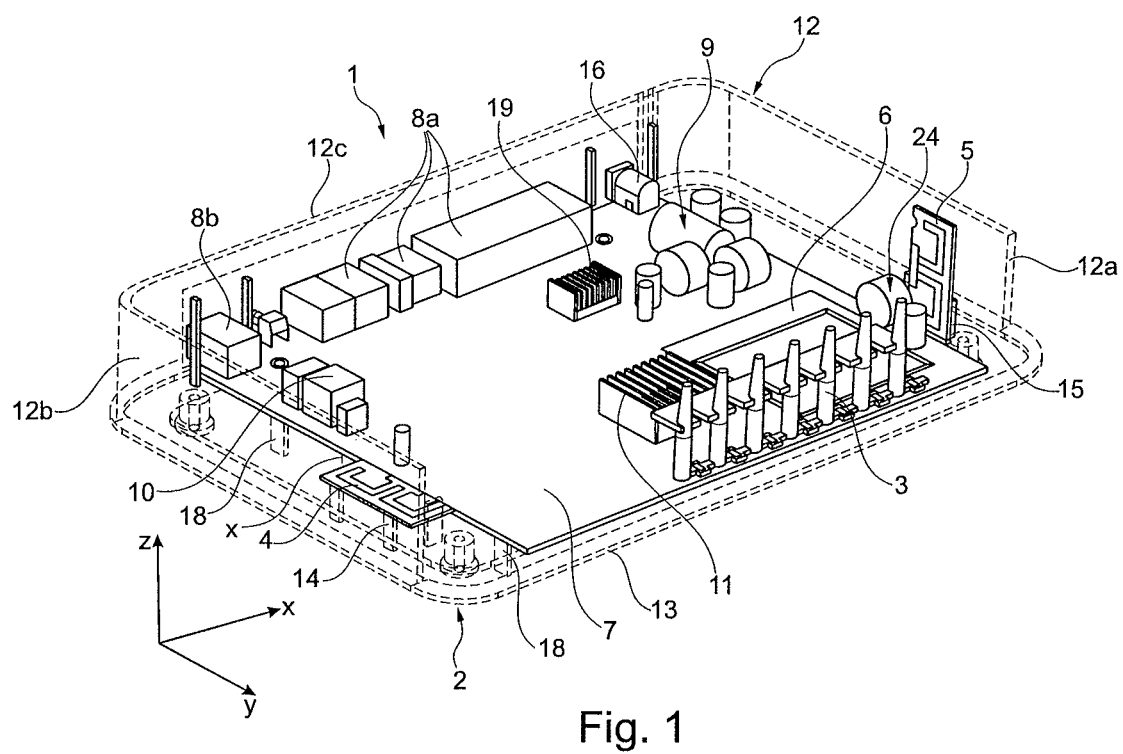
FIG. 1 illustrates a schematic perspective view of an access gateway according to a first embodiment of the present invention.
Figure 2:
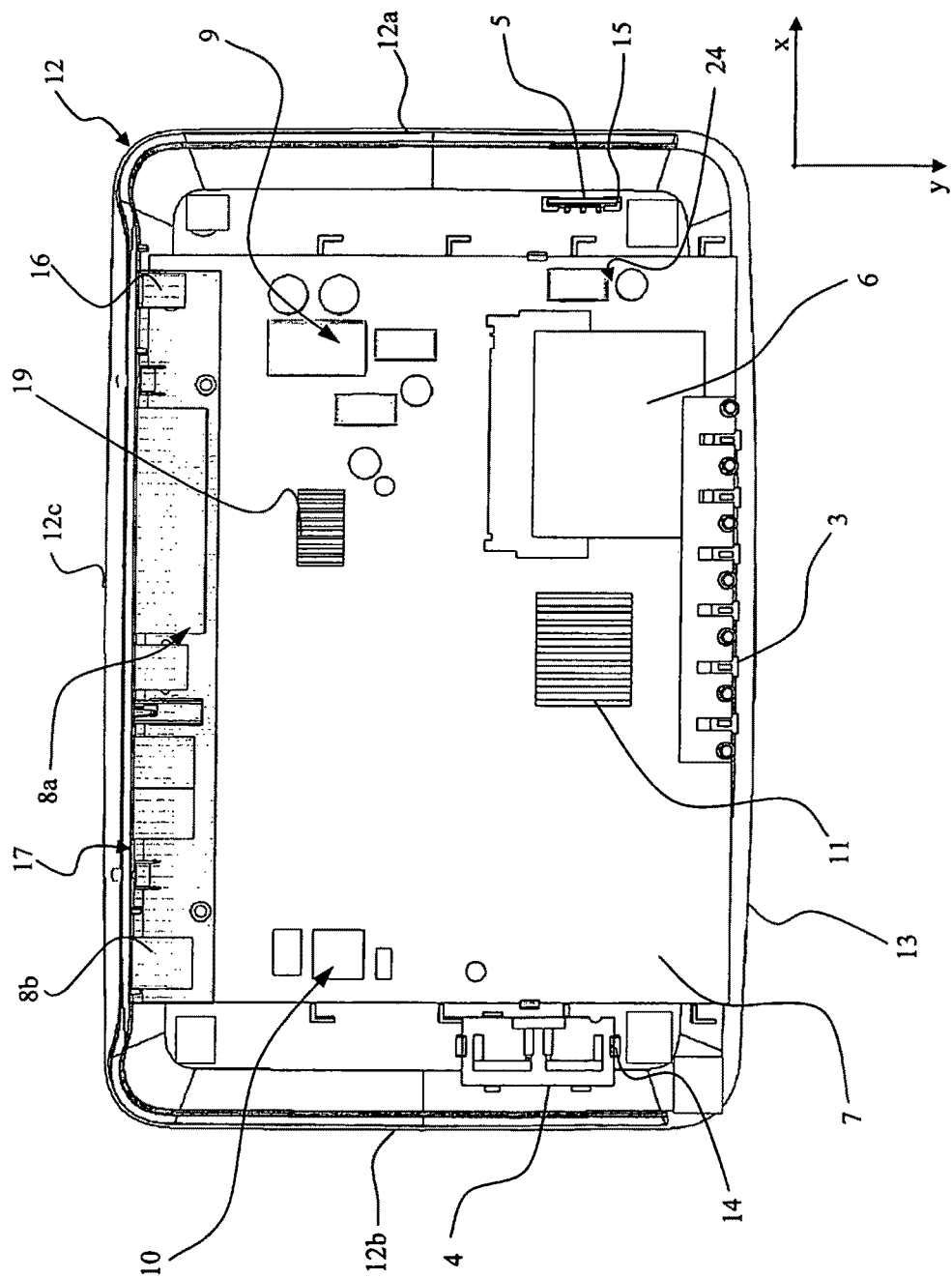
FIG. 2 illustrates a top planar view of the access gateway of FIG. 1.

FIGS. 1 and 2 illustrate a section of a schematic perspective view and a top planar view, respectively, of an access gateway (AG) according to a preferred embodiment of the present invention. Access gateway 1 is a wireless network device that may act as an entrance point to another network, for example the Internet or a mobile communication network. In a simplest WLAN configuration for small service areas and limited radio coverage, for example home multimedia application, the access gateway itself can provide the radio interface. In the preferred embodiments, the access gateway comprises a radio front-end, i.e., a system unit that processes radio-frequency (RF) signals in the send and receive directions, with an antenna system (detailed below) controlled by a proper RF switching technique.

Figure 3:
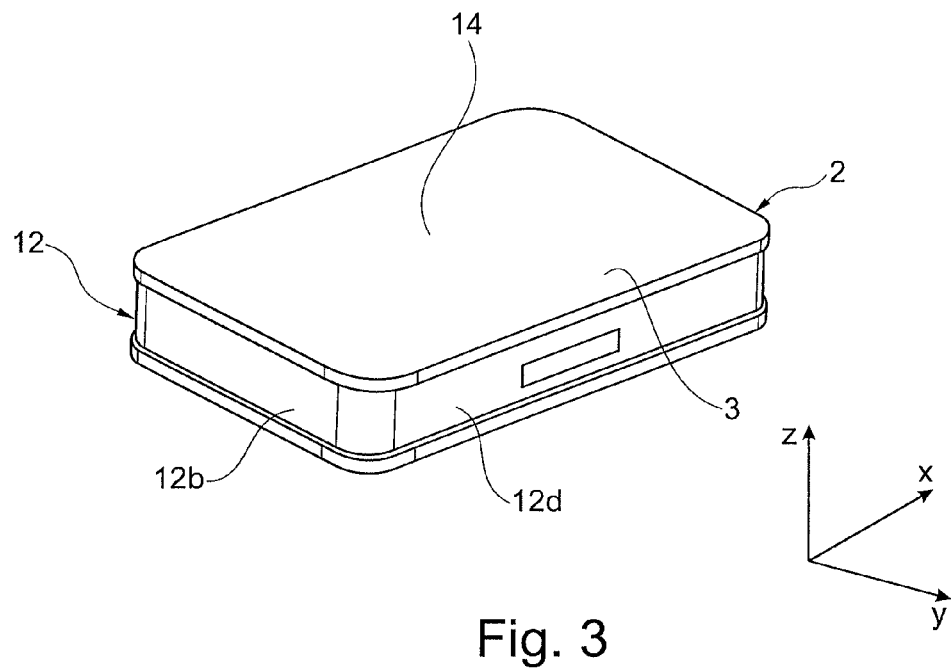
FIG. 3 illustrates a schematic perspective view of the access gateway of FIG. 1 with the housing closed by a cover.

The AG 1 is enclosed in an open-top housing 2 comprising a bottom wall 13 and peripheral enclosure 12 made of side walls 12a and 12b, opposite one another, rear wall 12c and front wall 12d. For the sake of clarity, in FIGS. 1 and 2, the front wall of the housing, opposite to the rear wall, is not shown. Front wall 12d is shown in FIG. 3, which illustrates a perspective view of the AG with the housing 2 closed by a cover 14 arranged opposite to and facing the bottom wall 13 (not visible in the figure). The housing can form with the cover a box of substantially cubic or rectangular parallelepiped shape. The housing 2 (and cover 14) is non-conductive to avoid shielding the antenna system and can be made for instance of plastic material. In FIGS. 1 and 2 (and in FIG. 7), the housing 2 is illustrated with see-through walls only in order to improve clarity of the drawings. It is however to be understood the housing can be made of a non-transparent material, as shown in FIG. 3 for the housing in a closed-up condition.

In the embodiment illustrated in FIGS. 1-3 the bottom wall 13 of the housing lies on a plane orthogonal to the planes on which the walls of the peripheral enclosure 12 lie. "Bottom" wall 13 with respect to the housing 2 is referred to a typical orientation of an AG, i.e., the one shown in FIGS. 1-3, in which the bottom wall comprises a base surface defining a base plane for the AG resting (horizontally) on a supporting surface, e.g., a table or a desk. As it will be described more in detail in the following, the AG can be arranged during operation with different orientations, e.g., it can be also arranged for vertical wall mounting with the bottom wall in close proximity with a house vertical wall.

The AG comprises an antenna system including first antenna 4 and second antenna 5, which are both mounted inside the housing 2 of the AG 1. According to the embodiment illustrated in FIGS. 1 and 2, the antenna system comprises two and not more than two antennas.

Each antenna can propagate a wave signal at radio frequencies within a frequency band, e.g., the WiFi frequency range, which is linearly polarized with a polarization direction extending along a main axis, hereafter referred to as the polarization axis.

Each antenna comprises a radiating element that extends mainly along a main direction, which will be referred to as the radiating element axis or longitudinal axis (of the radiating element). The longitudinal axis of the radiating element is arranged in a plane, which defines a plane that will be hereafter referred to as the plane of the radiating element or the antenna plane. In some embodiments, the radiating element extends along the longitudinal axis for at least 60% of its length (i.e., the electrical length), preferably for at least 70%. Within the present context, the radiating element may comprise for example one or more conductive strips or in general wiring structures which can contribute to the radiation and are arranged principally along the longitudinal axis. For example, the antenna can have a radiating element in a form of an elongated structure, such as a metallic tube or a metallic wire.

In the preferred embodiments, each antenna is substantially planar with the radiating element disposed on a surface of a planar substrate, which defines the plane of the radiating element. Within the present context, "substantially planar" may also include that the radiating element of the antenna can extend out of the radiating element plane on a normal direction by not more, in absolute value, than about $\lambda/8$. For instance, the radiating element can be one or more conductors arranged on a planar substrate and having a thickness of not more than $\lambda/8$.

Preferably, first and second antennas 4, 5 are dipole or monopole antennas. As it is known, typically, a dipole antenna is a substantially straight radiating element, i.e., an electrical conductor or a pair of electrically connected conductors arranged along a main direction (i.e., the longitudinal axis), measuring $\lambda_d/2$ from end to end and connected at the center to a RF feed line, where $\lambda_d$ is the wavelength of the electromagnetic field in the propagating medium, i.e., $\lambda/\sqrt{\varepsilon}$ with $\varepsilon$ being the effective dielectric constant and $\lambda$ the wavelength corresponding to the central frequency of the operating frequency range (for example to a frequency of 2.4 GHz corresponds a value of $\lambda$ of 12.5 cm). Typically, the radiating element is formed by two dipole arms of length $\lambda_d/4$. The polarization of the electric field radiated by the radiating element corresponds to the main orientation of the element. In other words, the dipole antenna is linearly polarized and the polarization axis corresponds to the longitudinal axis of the radiating element. The RF current in a dipole is maximum at the center (the point where the feed line joins the element), and is minimum at the ends of the radiating element. The point where the RF current is at its maximum will be referred to as the dipole center and is typically positioned at about the midpoint of the radiating element along its longitudinal axis.

Monopole antennas are formed by replacing one half of a dipole antenna with a ground plane at right-angles to the remaining half. If the ground plane is large enough, the monopole behaves like a dipole, as if its reflection in the ground plane formed the missing half of the dipole. In particular, a monopole antenna is provided with a radiating element that is approximately $\lambda_d/4$ long at the operating or radiating frequencies and which is electrically isolated from an electrically conductive ground plane to produce a radiation pattern approximating that of dipoles.

According to the preferred embodiments, antennas are dipole antennas since they can be generally realized with a simpler antenna design, especially when build on a printed board and they can be more easily incorporated in the AG housing than monopole antennas. Without limitation of the general scope of the invention, the following description of preferred embodiments will be directed to dipole antennas.

The oscillating electric dipole produces a radiation pattern that is substantially omni-directional with respect to a predetermined plane, which is generally orthogonal to the radiating element axis and in a plane perpendicular to the plane on which the radiating element is arranged. With omni-directionality of a dipole or monopole antenna it is meant that in the predetermined plane, the maximum gain in all directions is of at least 1 dB, thus not far from the value of 2.2 dB for an ideal dipole having two wires of null cross-section and extending only along a longitudinal direction.

Substantial omni-directionality of the radiation pattern of each antenna of the antenna system is particularly advantageous since, with the arrangement of the antennas within the housing of the AG according to the invention, it can guarantee a substantially omni-directional coverage of the wireless communication in the principal planes of the housing, as it will be described more in detail in the following.

The first antenna 4 is arranged in the housing 2 of the AG so that its radiating element is arranged on a plane substantially parallel to the plane defined by the bottom wall 13—i.e., a plane parallel to the (x,y) plane in FIGS. 1 and 2, referred also to as the base plane. The polarization axis of its radiating element is oriented along a first direction, i.e., the y axis. Within the meaning of the present invention, the term "substantially parallel" to the base plane may include that the plane of the radiating element may form with the base plane an angle not larger than about 10-15°, preferably within 5°.

The second antenna 5 is arranged in the housing so that its polarization axis lies along a direction substantially perpendicular to the first direction, i.e., along the z-axis, and is arranged on a plane substantially perpendicular to the plane on which the first antenna 4 lies, i.e., the (y,z) plane. Therefore, the polarization axis (coinciding with the radiating element axis in case of monopole or dipole antennas) of the second antenna 5 lies on a plane substantially perpendicular to the plane defined by the bottom wall 13 of the housing. Preferably, the plane on which the polarization axis of the second antenna lies is arranged to be substantially parallel to a side wall 12a of the housing. The second antenna 5 will be also herein referred to as the vertical antenna or vertically oriented antenna. The mutual spatial orientation of the two antennas is such that where the first antenna has a higher gain in one polarization, the second antenna has higher gain in the orthogonal polarization, thereby achieving polarization diversity. Polarization diversity is obtained by placing the first antenna 4 so that its dominant polarization extends substantially along a first direction, e.g., along the y-axis, while placing the second antenna 5 so that its dominant polarization extends a second direction, orthogonal to the first direction, (e.g., along the z-axis).

Given that the polarization axes of the two antennas are orthogonal, lie on perpendicular planes and one of one of the antennas is arranged on a plane substantially parallel to the bottom wall, the antenna system is able to maintain communication quality when the AG is placed in different operating positions. For instance, high-quality indoor wireless communication can be obtained with the AG placed horizontally on a supporting surface, e.g., the bottom wall being arranged on a desk or table, or with the AG placed vertically, e.g., hanged on a house wall with its bottom wall being placed adjacent to or in contact with the house wall.

The antennas 4 and 5 can be secured on the inner walls of the housing 2 by means of holding structures 14 and 15, respectively. In the embodiment of FIGS. 1 and 2, antennas 4 and 5 are planar antennas with the radiating element disposed on a planar substrate.

In FIGS. 1 and 2, reference number 6 denotes a transceiver chipset which acts as radio front-end in the AG 1. The chipset can be built on a mini PCI card containing the RF circuitry, which is preferably integrated on a common die. RF circuitry generally comprises radio-frequency filters (usually in SAW technology), intermediate-frequency filters, and duplexers, which permit switching between transmitted and received streams. It may include demodulators and amplifiers. The chipset supports a set of algorithms (i.e., the chipset's firmware) implementing the RF switching schemes.

Figure 4:
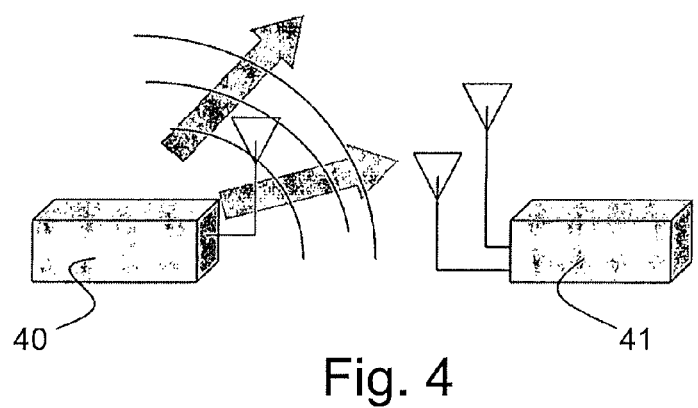
FIG. 4 is a symbolic representation of a 2×1 SIMO RF switching scheme.

According to a first embodiment, the RF switching scheme is the so-called SIMO (single input, multiple output) in which multiple antennas are used at the destination (receiver). The source (transmitter) has only one antenna. In particular, the RF switching scheme of the present embodiment is 2×1, which uses two receiving signals and one transmitting signal. The transmitter switches between the two antennas to select the one with best signal strength. The receiver receives the signals from two antennas, which are combined into an improved signal. Preferably, on the receiving side, an algorithm, implemented on the radio front end, combines the two signals coming from both the antennas and determines the best one in terms of signal-to-noise ratio (SNR) or Received Signal Strength Indicator (RSSI). Before the transmission phase starts, the technique selects the antenna with the best SNR or RSSI through the switching network for the communication. The selection of the transmitting antenna depends on the quality of the receiving streams. FIG. 4 is a symbolic illustration of a 2×1 SIMO switching scheme, in which 40 represents the transmitter and 41 represents the receiver, which is in practice implemented in the radio front-end.

Preferably, the radio front-end (represented with chipset 6 in FIGS. 1 and 2) implements a Maximal Ratio Combining (MRC) processing technique, which is a known technique that uses pilot or control channel signals to estimate radio channel characteristics for multiple antennas and then apply weights to each antenna to maximize the SNR for the summed signal. To make MRC work, two (or more) receivers are needed, where phase shifters and variable gain amplifiers suitably implemented realize the required RF signal processing. MRC can be advantageous in SIMO schemes since it provides a good performance in a fading environment where the individual receiver signal fades are statistically independent.

SIMO techniques and in general MIMO techniques require substantial uncorrelation between the receiving (and transmitting in case of MIMO) streams.

In order to reduce correlation between the receiving streams, the antenna pair is configured so as to achieve, in addition to polarization diversity, spatial diversity. The first and second antennas are separated by a distance (along the x-axis) of at least $\lambda/2$, where $\lambda$ is the wavelength of the radio signals. Preferably, said distance is at least $2/3\lambda$. Preferably, said distance is not larger than $3\lambda$, more preferably not larger than $1.5\lambda$. The distance between the antennas can be taken to be the distance between the dipole centers of the antennas. In general, the distance can be defined in a direction perpendicular to the first and the second longitudinal axes (i.e., the x-axis in FIGS. 1 and 2). According to one embodiment, $\lambda$ is comprised in the frequency band ranging from 2.400 to 2.485 GHz, i.e., the WiFi frequency band defined in the IEEE 802.11b specification. According to one embodiment, the antenna spacing is not smaller than about 6 cm.

A main circuit board 7, which is preferably a printed circuit board (PCB), is enclosed in the housing 2. The PCB comprises un upper surface and a lower surface, opposite to each other in a normal direction, the lower surface being arranged on the bottom wall 13 of the housing. Both antennas are connected through the PCB to a diversity receiving circuit, which, in the present embodiment, is included in chipset 6. Therefore, signal waves that are received by the two dipole antennas are sent to the diversity receiving circuit, in which one of the signal waves having higher reception strength is selected or the signal waves from both the antennas are combined, and then the resulting combined wave is sent to the receiver and is received.

Preferably, the PCB upper surface is substantially parallel to the base plane of the bottom wall 13 of the housing, i.e., the PCB upper surface is arranged so as to form an angle of not more than 3-5° degrees with the base plane. The plane on which the first antenna 4 lies is thus substantially parallel to the upper surface of the PCB. Preferably, the plane of the first antenna 4 forms with the PCB upper surface an angle of not more than 10-15°, more preferably within 5°.

One or more electronic components, and generally a plurality of components, are mounted on the upper surface of the PCB. "Upper" and "lower" surfaces with respect to the housing and the PCB are referred to a typical orientation of AG, i.e., the one shown in FIGS. 1-3 where the bottom wall 13 functions as a base for the AG. Preferably, the PCB 7 acts as a common platform for at least some of the electronic components and provides for the electrical connections between them through metallic traces across or through the board. In the embodiment shown in FIG. 1, the PCB rests on a supporting frame 18 to allow airflow between the bottom wall and the PCB lower surface for cooling the electronic components. The distance between the bottom wall and the PCB lower surface in a direction perpendicular to the PCB lower surface is for instance of 0.6 cm.

The electronic components comprise a power supply module 9, one or more connectors and/or interfaces 8a, a processor module 11, and optionally a DSL module 10 electrically connected to a DSL connector 8b. Electronic modules are schematically illustrated in the FIGS. 1 and 2 as a single or a plurality of functional blocks, although it is to be understood that each block may in fact include one or more electronic components (e.g., capacitors, relays, transformers, etc.), as exemplified in the following.

The power supply module 9 may comprise a switched power supply unit, circuits for over-current and over-voltage protection and DC/DC converters. The power supply module 9 is connected to a power supply connector 16 through the PCB 7. The one or more connectors 8a can be Ethernet ports, such as RI 45-connectors, telephone ports, such as RJ 11-connectors, USB host and device ports, which are accessible from the exterior of the AG through one or more openings of the rear wall 12c of the housing and are connectable to a wired network, e.g., the Internet or PSTN, via a cable connection (not shown). The DSL front-end 10 may comprise a transformer that acts as an analog interface for transforming the voltage of the incoming and outgoing transmission signals to the PSTN through connector 8b, e.g., a RJ 11-connector. According to an embodiment, the processor module 11 comprises a CPU (central processing unit) chip on which a heat sink made of metallic material for cooling the chip is mounted. A DSL interface may be included in the processor module. An additional processor module 19 comprising a CPU chip cooled by a heat sink for the control of the Ethernet ports may be included. Reference numeral 24 indicates inductors for the power supply, which may be present in the proximity of the second antenna 5. Additional driving circuits (not shown) functioning as interfaces for the wired and wireless network may be present.

The electronic components housed in the AG can affect the radiation pattern of an antenna that is positioned close to them due to the fact that electric fields are present during operation of the electronic components and their physical encumbrance may act as electrical radiation shield. For instance, the metallic heat sinks on the CPU chips in modules 11 and 19 when in the direct vicinity of the antennas may change their impedance and thus may reduce the overall efficiency of the antenna system. The PCB itself (i.e., during operation, currents run through its conductive traces) may also act as a shield for the radiation patterns of the antennas by partially deforming or blocking the antenna signals. Influence of the electronic components can be particularly detrimental when, as in the present case, the antennas are arranged inside the housing of the AG.

In the proximity of the front wall 12d, there is optionally an array 3 of plastic light-pipes connected to light-emitting devices—LEDs—(not shown). The light pipes extend from the bottom wall 13 up to the cover 14 that is provided with holes (FIG. 3) through which the light pipes project and are visible from the exterior of the housing box for light indication of operating conditions. The light pipe array 3 may represent a further obstacle to electromagnetic radiation of the antennas.

Antenna positioning has been therefore studied by the Applicant in order to minimize the interactions with the other electronic components. The AG area with connectors 8a and 8b and power supply socket(s) 16, indicated in FIG. 2 with dashed area 17, is a region where, when the AG is connected to one or more wired networks, powered cables (not shown) are connected to the jacks and sockets. Area 17 is usually positioned in the house wall proximity, if the AG is placed horizontally on a supporting surface, or directed toward the room ceiling if the AG is arranged on a house vertical wall. Connectors and cables affect heavily antenna matching within frequency bands and thus radiation patterns. Antennas are preferably placed in a front half the housing, opposite to the rear half provided with the external connectors. Preferably, the antennas are arranged at a distance of not less than $\lambda/2$, more preferably not less than $\lambda$, from the outermost edge of the plurality of connectors 8a and 8b and socket 16. In the present embodiment, DSL module 10 and power supply module 9 are present in the rear half of the PCB. A distance of at least $\lambda/4$ (e.g., about 30 mm for WiFi applications at 2.4 GHz) from the DSL and power supply modules helps to avoid the interaction between the antennas and the massive components such as capacitors inductances and transformers present in the modules. Preferably, the dipole center of the second antenna 5 is placed at a distance of at least $\lambda/8$ from inductors 24.

Both antenna 4 and 5 are preferably placed externally of the PCB 7 in order to reduce the influence of the PCB in their radiation pattern. Preferably, the lateral distance from the proximal edge of each antenna to the PCB (e.g., the proximal edge of its planar substrate) is of at least about 2 mm. In the embodiments of FIGS. 1 and 2, said lateral distance is along the x-axis for the first and the second antenna.

The PCB acts as a reflecting surface that reflects the radiation field emitted by the antennas and produces a maximum in a direction substantially perpendicular to the reflecting surface. The Applicant has found that if the radiating element of the horizontally oriented antenna 4 is positioned in a plane in the proximity of the plane defined by the upper surface of the PCB, radiation gain is improved along the direction defined by the intersection between the plane orthogonal to the radiating element axis (where gain is maximum) and the plane on which the radiating element lies, since distortions due to reflections from the PCB along that direction are reduced. Preferably, the radiating element of the first antenna 4 is placed within a distance along the z axis from the plane defined by the upper surface of the PCB of not more than $\lambda/4$ (e.g., about 3 cm for WiFi applications at 2.4 GHz), more preferably of not more than $\lambda/8$.

Thickness of the PCB 7 is for example of 1.5 mm, which is generally much smaller than the value of $\lambda/4$ for frequency bands typically used in WLAN applications.

According to a preferred embodiment, the upper surface of the planar substrate of dipole antenna 4 (i.e., the radiating element axis of antenna 4) lies substantially in co-planarity with the upper surface of the PCB 7, i.e., within 5 mm from the PCB upper surface in a normal direction, more preferably within 2 mm.

The vertically oriented antenna 5 is preferably positioned with the proximal edge of its radiating element in close proximity to the upper surface of the PCB along the longitudinal axis of its radiating element (i.e., the z-axis). Preferably, the proximal edge of the radiating element of antenna 5 is placed at a distance of not more than about 5 mm from the upper surface of the PCB. In some embodiments, antenna 5 is a dipole antenna having a dipole center placed at a distance along its longitudinal axis of at least of about $\lambda/4$ from the upper surface of PCB, preferably of about $\lambda/4$.

The position of the vertically oriented antenna 5 with respect to the horizontally oriented antenna 4 is preferably such that the dipole centers of the two antennas lie within a distance along the radiating element axis of the first antenna 4 (i.e., the y-axis) of not more than $\lambda/4$.

Although the first antenna can also lie with its radiating element under the lower surface of the PCB (i.e., the above described distances from the first antenna plane to the upper surface of the PCB should be considered in absolute value), the antenna should preferably lie not too close to or in direct contact with the bottom wall of the housing. In that case, the bottom wall, even if made of a non-conductive material, would affect the electro-magnetic (EM) signals propagating from the antenna with a consequent noticeable deformation of the radiation pattern. Preferably, the distance between the proximal main surface of the antenna, i.e., the rear surface, and the bottom wall is of at least 3 mm, more preferably of at least 5 mm. This is also to avoid close proximity with a conductive horizontal plane, i.e., (x,y) plane, such as a metallic desk on which the AG may rest, which acts as a reflecting surface for the horizontal component of the EM field.

Figures 5, 6:
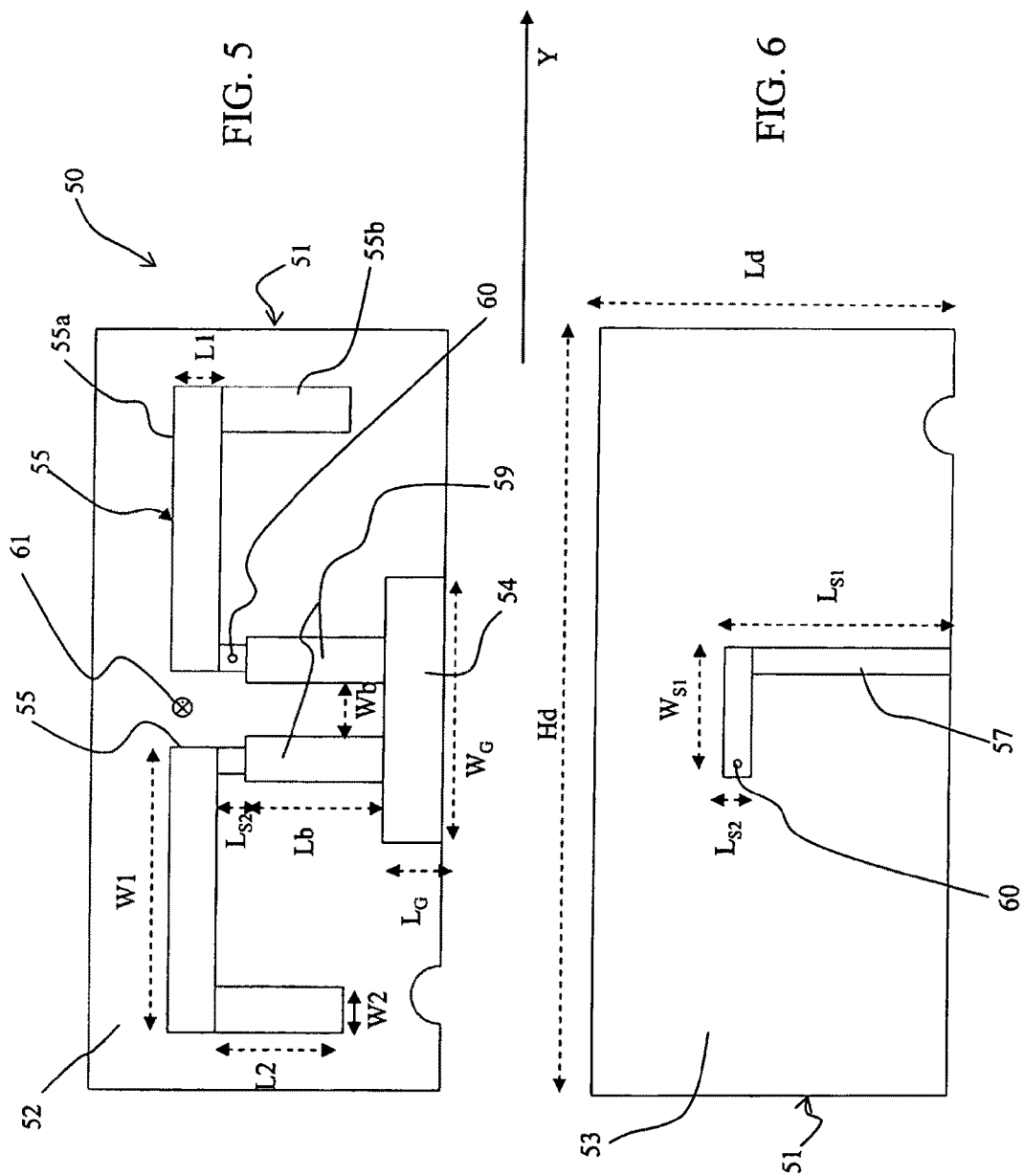
FIG. 5 is planar top view of a dipole antenna according to an embodiment of the present invention.
FIG. 6 is a planar bottom view of the dipole antenna of FIG. 5.

Preferably, each antenna is a printed dipole antenna fabricated on a dielectric substrate. FIGS. 5 and 6 are planar views (front and rear, respectively) of a planar dipole antenna according to an embodiment of the present invention. The dipole antenna 50 comprises a dielectric substrate 51 having a front surface 52 (FIG. 5) and a rear surface 53 (FIG. 6). For example the dielectric substrate can be a FR-4 PCB substrate of 0.8 mm thickness and a relative dielectric constant of about 4.7. Printed on the front surface 52 of the substrate is a double U-shaped dipole conductive strip comprising two legs 59, each connected to a dipole arm 55. The main orientation of the dipole arms 55 defines the radiating element axis of the antenna (or, for this type of antenna, the dipole axis), which, in FIG. 5, is oriented along the Y axis. Legs 59 connect to a conductive ground plane 54, also printed on the front surface. Printed strips are metallic, made for instance of copper.

The dipole arms 55 are folded in an L-shape so as to reduce the overall antenna height, $H_d$. The length of each dipole arm 55, i.e., substantially the sum of the length of straight portions 55a and 55b ($L_2 + W_1$), which can be referred also to as the electrical length, is about $\lambda_d/4$ and preferably of approximately $\lambda_d/4$, where $\lambda_d$ is the wavelength of the electromagnetic field in the propagating medium, i.e., $\lambda/\sqrt{\varepsilon}$ where $\varepsilon$ is the effective dielectric constant of the propagating medium and $\lambda$ the wavelength associated to the central frequency of the operating frequency band, e.g., 2.45 GHz.

According to an embodiment, the dielectric substrate has a height, $H_d$, of 40 mm and a length, $L_d$, of 18 mm.

Given that the dipole arms are L-shaped, the radiating element comprising the dipole arms 55 extends also along a direction transversal to the longitudinal axis, i.e., sections 55b. Preferably, at least 60%, and more preferably at least 70%, of the electrical length of each dipole arm extends along the longitudinal direction. It is to be noted that the sections 55b of the dipole arms 55 give raise to a small contribution to the electrical field compared to the sections 55a, the contribution depending also on the distance along the longitudinal direction between the two sections, since the currents running along the sections 55b have opposite sign.

A micro-strip feed line 57 is printed on the rear surface 53 of the dipole antenna 50. In the present embodiment, the micro-strip 57 is L-shaped. The via hole 60 connects the end of a dipole arm 55 to the micro-strip 57 through the substrate 51. The feeding of the antenna is realized by means of a coaxial cable (not shown) connected on one end to the radio front end. On the opposite end, the inner conductor of the coaxial cable is soldered to the micro-strip 57, whereas the outer or grounding conductor of the cable is soldered to the ground plane 54 of the antenna. In this antenna, the feeding structure forms a balun with the ground plane of the dipole, which allows to pass from a balanced configuration (coaxial cable) to a unbalanced configuration (printed dipole). The soldering scheme of the coaxial cable can be different, for example by introducing a further metallic via (not shown) external of the feed line 57 and connected to the ground plane 54 through the dielectric substrate and to the feed line 57 by the inner conductor of a coaxial cable.

The position of the dipole center of antenna 50 is schematically indicated with reference number 61. The dipole center lies approximately equidistant from the ends of the dipole arms along the longitudinal axis, i.e., the Y axis in FIG. 5 and is approximately the midpoint for the radiating element along the radiating element axis.

For a central frequency of 2.45 GHz, exemplary sizes of the conductive strips making the dipole antenna can be (reference is made to FIGS. 5 and 6): $W_1=15$ mm, $W_2=2.4$ mm, $L_1=2.5$ mm, $L_2=6.5$ mm, $L_G=3$ mm, $W_G=14$ mm, $L_b=7$ mm, $W_b=W_G$, $W_{S1}=6.8$ mm, $L_{S1}=11.4$ mm, and $L_{S2}=1.4$ mm. In this example, about 30% of the electrical length ($W_1+L_2$) is along a direction transversal to the longitudinal direction.

In the embodiment illustrated in FIGS. 1 and 2, the dipole antenna 4 is a printed dipole antenna oriented with the upper surface opposite to the bottom wall 13 of the housing and facing the open top (or cover 14), while the dipole antenna 5 is a printed dipole antenna oriented with the upper surface facing the first antenna 4.

Figures 9A, 9B:
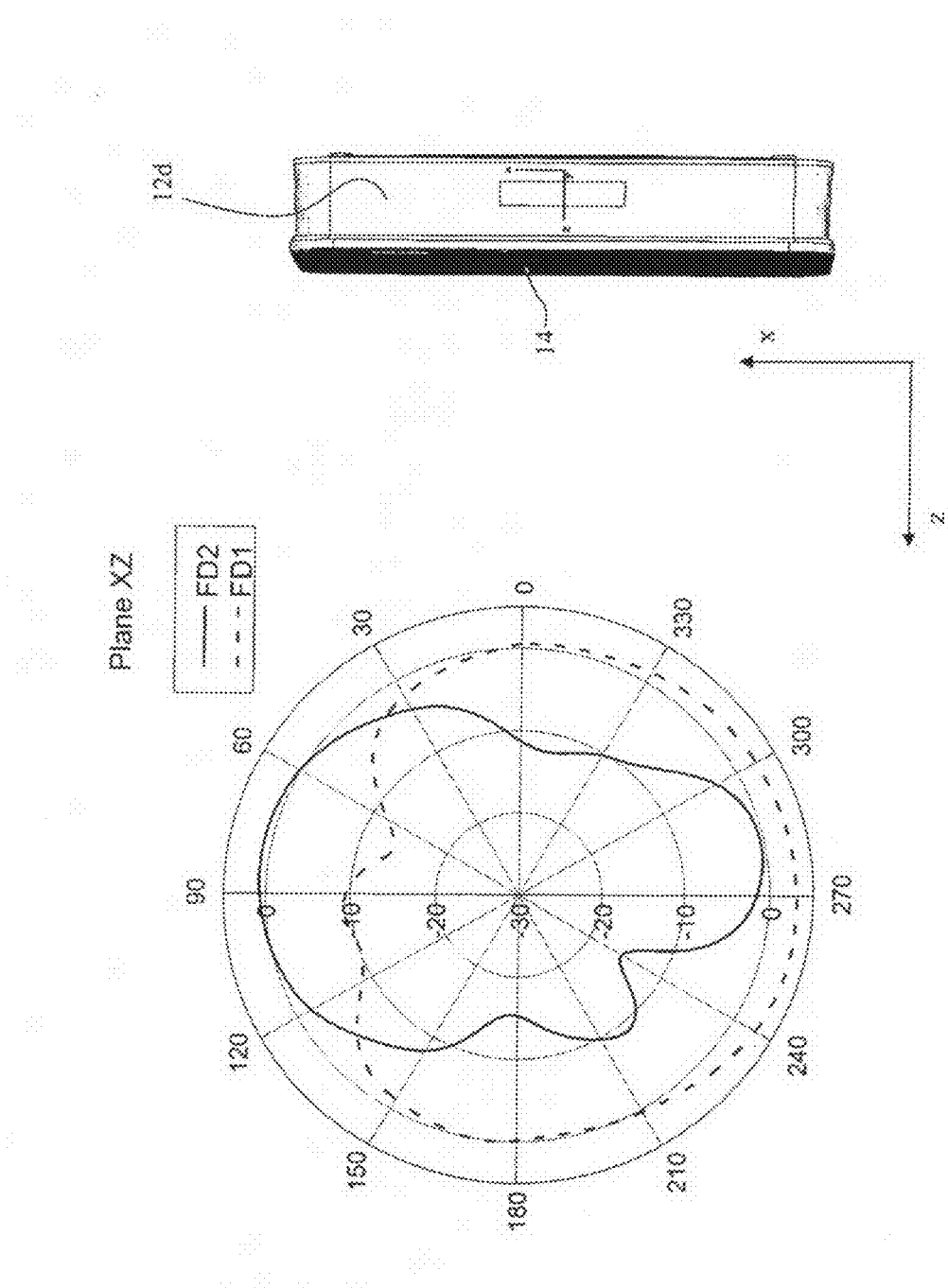
FIG. 9a show the measured far field gain patterns in an xz plane of the antenna system of FIGS. 1-3. The orientation of the gateway during measurements of the pattern of FIG. 9a is schematically illustrated in FIG. 9b.
Figures 10A, 10B:
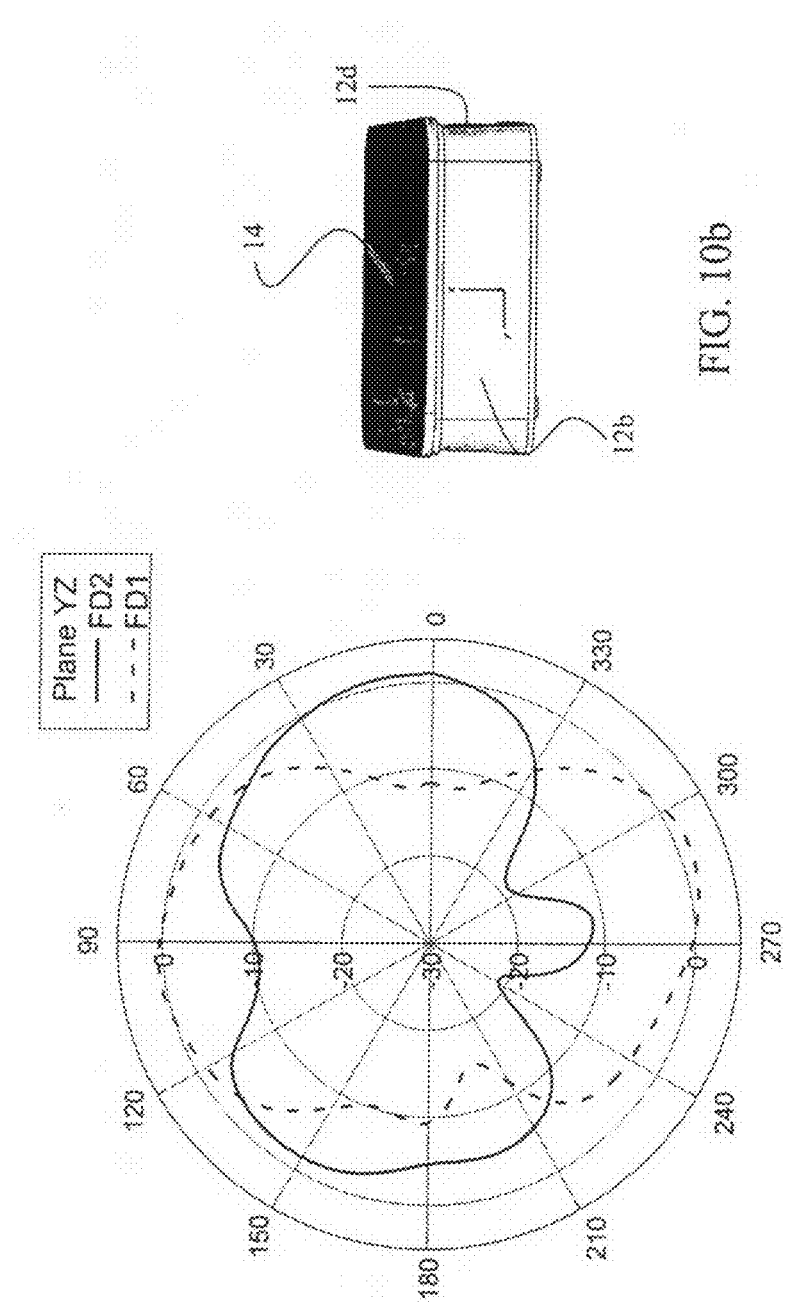
FIG. 10a show the measured far field gain patterns in an yz plane of the antenna system of FIGS. 1-3. The orientation of the gateway during measurements of the pattern of FIG. 10a is schematically illustrated in FIG. 10b.

FIGS. 8a, 9a and 10a plot the co-polar far field gain patterns measured in an anechoic chamber along three principal planes for an AG according to the embodiment shown FIGS. 1-3 and having an antenna system with printed dipole antennas of the type shown in FIGS. 5 and 6 and operating at 2.45 GHz. Dashed line represents the gain pattern of the horizontally oriented antenna, i.e., first antenna 4 (indicated in the diagrams with FD1), whereas solid line represent the gain pattern of the vertically oriented antenna, i.e., second antenna 5 (indicated in the diagram with FD2). In particular, FIG. 8a shows the radiation pattern measured with the AG housing horizontally positioned along the (x,y) plane in a typical orientation with the bottom wall being the base on which the AG rests, as schematically illustrated in FIG. 8b. Measurements were taken in a plane parallel to (x,y) at a distance in the far field region.

FIG. 9a shows the radiation pattern measured in a plane parallel to the front wall 12d and with the AG housing vertically positioned and resting in a plane perpendicular to the bottom wall 13 (and cover 14), i.e., the (x,z) plane, as schematically illustrated in FIG. 9b. This orientation of the AG may be typical if the AG is hanged on a house vertical wall with the bottom wall in proximity to the house wall.

FIG. 10a plots the radiation diagram measured with the AG housing horizontally positioned in a plane parallel to the side wall 12b, as schematically illustrated in FIG. 10b.

Experimental results show that the combined radiation patterns of the antennas 4 and 5 in the three main planes are substantially omni-directional with the ripple not exceeding 5 dB in more than 92% of the round angle in the three main planes on which the measurements of FIGS. 8a, 9a and 10a were taken.

The cross-correlation coefficient, or envelope correlation, can be calculated from the radiation diagrams according to known equations, reported for instance in the cited article by S. B. Yeap et al. The envelope correlation was calculated for each of the main planes from the radiation diagrams of FIGS. 8a, 9a and 10a and was found not to exceed the value of 0.12 for the antenna system in each main plane.

Figure 7:
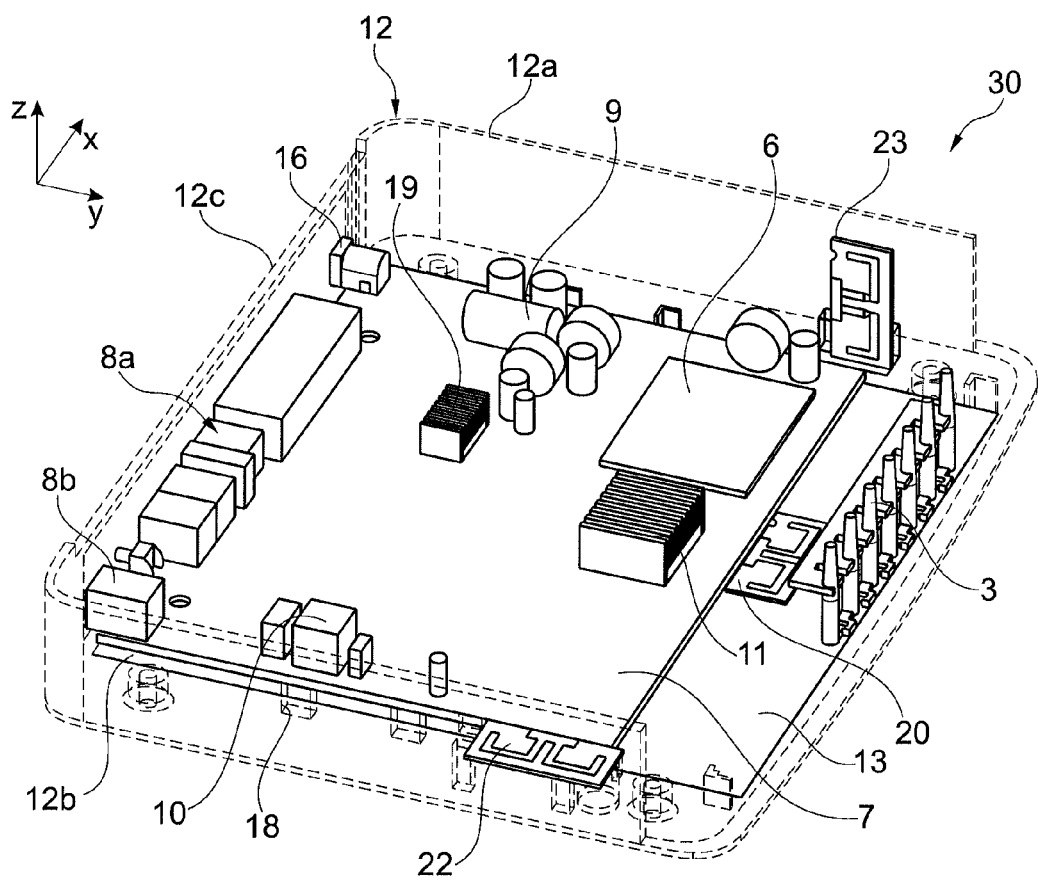
FIG. 7 illustrates a schematic perspective view of an access gateway according to a second embodiment of the present invention.

FIG. 7 illustrates a perspective view of an AG according to a further embodiment of the present invention. According to a this embodiment, the RF switching scheme can be a 3×1 SIMO in which three antennas are used at the receiver and one antenna is used at the transmitter. Preferably, the switching scheme is a 3×2 or 3×3 MIMO, which uses both receiving and transmission diversity. Combination of signals may work with known signal processing techniques, such as spatial multiplexing or space-time coding according to the emerging IEEE 802.11n standards.

Transmission and reception diversity require uncorrelation of the transmitted and received streams. The Applicant has devised an AG including an antenna system comprising at least three internal antennas having a low level of correlation and providing high-quality wireless communication for different positions of the AG housing with respect to a supporting surface or house wall.

In the embodiment of FIG. 7, the antenna system comprises three and not more than three antennas. The three antennas are physically separated within the housing of the AG so as to achieve spatial diversity and they are oriented with orthogonal polarizations so as to achieve three-axis polarization diversity.

In FIG. 7, the same reference numbers are given to elements corresponding to those shown in FIG. 1 and their detailed description is hereafter omitted. The AG 30 comprises three antennas arranged inside the housing 2 and whose radiating element extends substantially along a longitudinal axis, i.e., the radiating element axis. Each antenna is linearly polarized. The first antenna 22 comprises a radiating element with the longitudinal axis in a plane that is horizontally oriented with respect to the bottom wall 13 of the housing 2 of the AG, i.e., the plane is substantially parallel to the bottom wall 13, and having a polarization axis oriented along a first direction, i.e., the y axis. The second antenna 23 comprises a radiating element with the longitudinal axis in a plane that is vertically oriented with respect to the bottom wall 13 of the housing and having a polarization axis along a second direction (the z axis) substantially perpendicular to the polarization axis of the first antenna 22. The longitudinal axis of the radiating element of the second antenna 23 lies on a plane substantially perpendicular to the plane of the radiating element of the first antenna 22.

Preferably, the second antenna is positioned within the housing on a plane substantially parallel to a side wall 12a of the housing 2. The minimum distances of the first and second antennas 22 and 23 in the (x,y) plane from the bottom wall 13, connectors 8a, 8b and 16, and the electronic modules 9, 10, 19 and 11, which are mounted on the PCB 7, can be preferably selected to be the same as those given with reference to the first embodiment of the present invention illustrated in FIGS. 1 and 2.

Preferably, the first and the second antennas 22 and 23 are arranged within the housing 2 of access gateway 30 as first and second antennas 4 and 5 of the embodiments described with reference to FIGS. 1 and 2.

The housing 2 of gateway 30 may include a cover 14 (not shown in FIG. 7) opposite to the bottom wall so that in a closed-up condition, the gateway 30 can be illustrated in a perspective view by FIG. 3.

The third antenna 20 is a linearly polarized antenna for propagating a wave signal along a polarization axis oriented perpendicularly to the polarization axes of the first and the second antennas 22 and 23, i.e., the perpendicular axis of the third antenna is arranged along the x axis. By being the polarization axes of the three antennas oriented along three substantially perpendicular directions, maximal polarization diversity of the antenna system is obtained. The third antenna 20 comprises a radiating element extending along a longitudinal axis, which preferably lies in a plane perpendicular to the plane of the radiating element of the second antenna 23.

In the preferred embodiments, each antenna is substantially planar with the radiating element disposed on a surface of a planar substrate defining the plane of the radiating element.

In order to reduce interference of the radiation patterns with the PCB, the third antenna 20 is preferably arranged outside the PCB 7, for instance with its proximal edge (e.g., the proximal edge of its planar substrate) at a distance of at least 2 mm along the y axis from the outer edge of the PCB.

Preferably, the third antenna is arranged on a plane substantially parallel to the plane of the first antenna 22, thus parallel to the plane defined by the bottom wall 13. In this way, interferences of the electronic components and of the PCB itself to the radiation patterns can be reduced. Preferably, the third antenna 20 is positioned with the plane of the radiating element in the proximity of the plane defined by the upper surface of the PCB in order to reduce distortions due to reflections from the PCB. Preferably, the third antenna 20 is placed within a distance along the z axis from the plane defined by the upper surface of the PCB of not more than $\lambda/4$, more preferably of not more than $\lambda/8$.

Preferably, the upper surface of the antenna 20 is arranged in substantial co-planarity with the upper surface of the PCB 7, i.e., within 5 mm from the PCB upper surface in the normal direction, more preferably within 2 mm, so as to minimize the deformations of its radiation diagram due to the reflections from the PCB.

Preferably, the plane of the radiating element of the third antenna 20 is arranged substantially in co-planarity with the plane of the radiating element of the first antenna 22.

The three antennas are spatially separated within the housing in order to realize spatial diversity of the antenna system. The distance between the first antenna 22 and the third antenna 20 is not smaller than $\lambda/2$, where $\lambda$ is the wavelength of radio signals. Preferably said distance is not larger than 3×, more preferably, is not larger than 1.5×. Distances between antennas along a particular direction are defined as the distances between the dipole centers of the antennas. For example, for a central frequency of 2.45 GHz, the distance between the first and third antenna is of about 11 cm.

The distance between the first antenna 22 and the second antenna 23 along the x axis is not smaller than $\lambda/2$. According to an embodiment, the distance between the first and the second antenna is of at least $\lambda$. For example, for a central frequency of 2.45 GHz, the distance is about 22 cm.

In the illustrated embodiment, the three antennas are arranged in the close proximity of the outer edges of the PCB 7, e.g., at a distance of not more than 2-3 mm between the edge of each antenna proximal to the respective outer edge of the PCB. In is however to be understood that first, second and third antennas can be placed in the housing so as to occupy the vertices of a triangle of side of at least $\lambda/2$.

According to a preferred embodiment, the dipole centers of the first and the second antenna lie at a close distance along the direction of the longitudinal axis of the first antenna (i.e., the y axis), which is not larger in absolute value than $\lambda/4$.

The distance of the third antenna 20 from the array of light pipes 3 is of at least 0.5 cm and the distance from the front wall (not shown in FIG. 7) is of at least 0.5 cm.

Figures 11A, 11B:
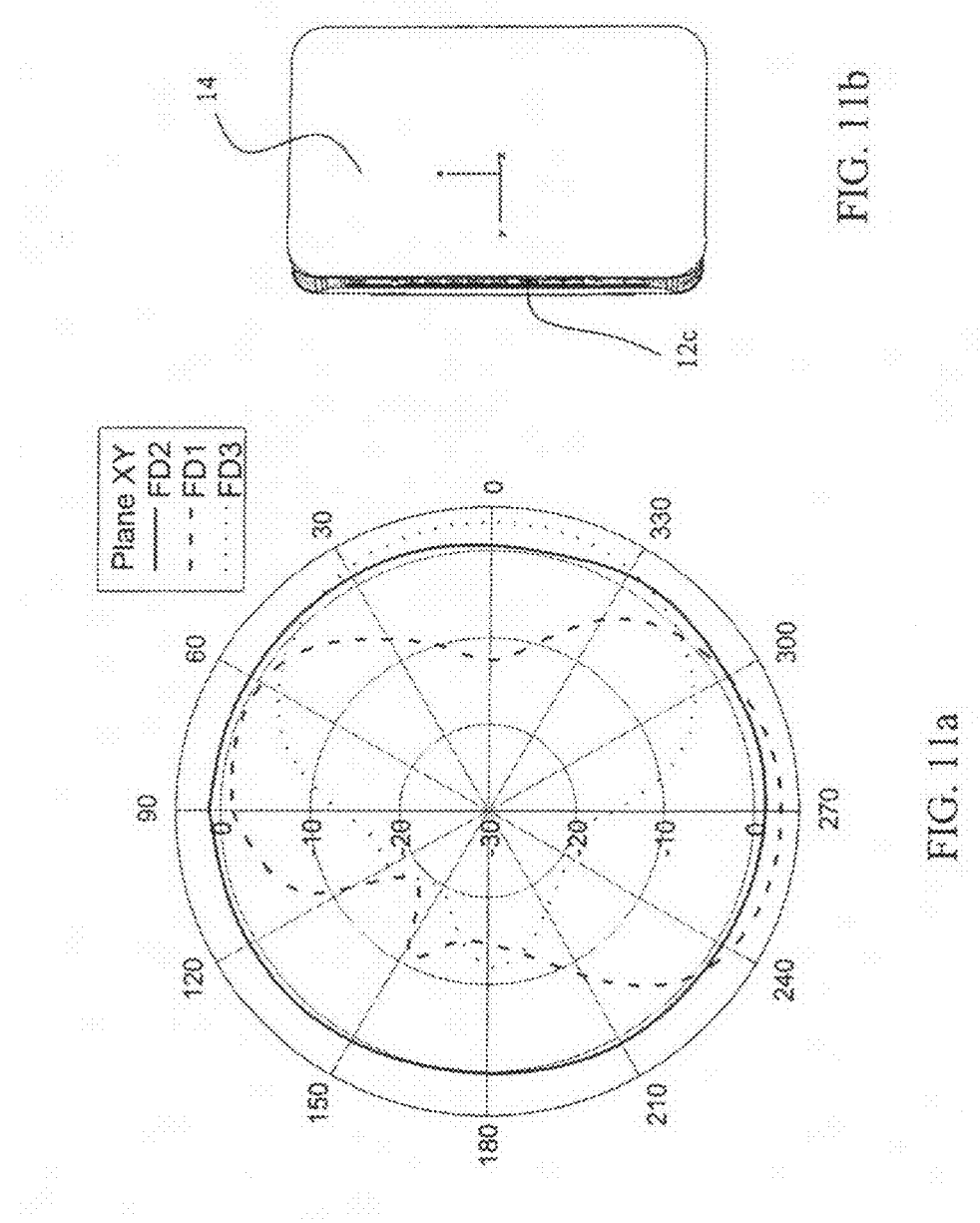
FIG. 11a show far field gain patterns in an xy plane of the antenna system of FIG. 7 obtained from computer simulations. The orientation of the gateway in the simulations of the pattern of FIG. 11a is schematically illustrated in FIG. 11b FIG. 12a show the far field gain patterns in an xz plane of the antenna system of FIG. 7 obtained from computer simulations. The orientation of the gateway in the simulations of the pattern of FIG. 12a is schematically illustrated in FIG. 12b.
Figures 12A, 12B:
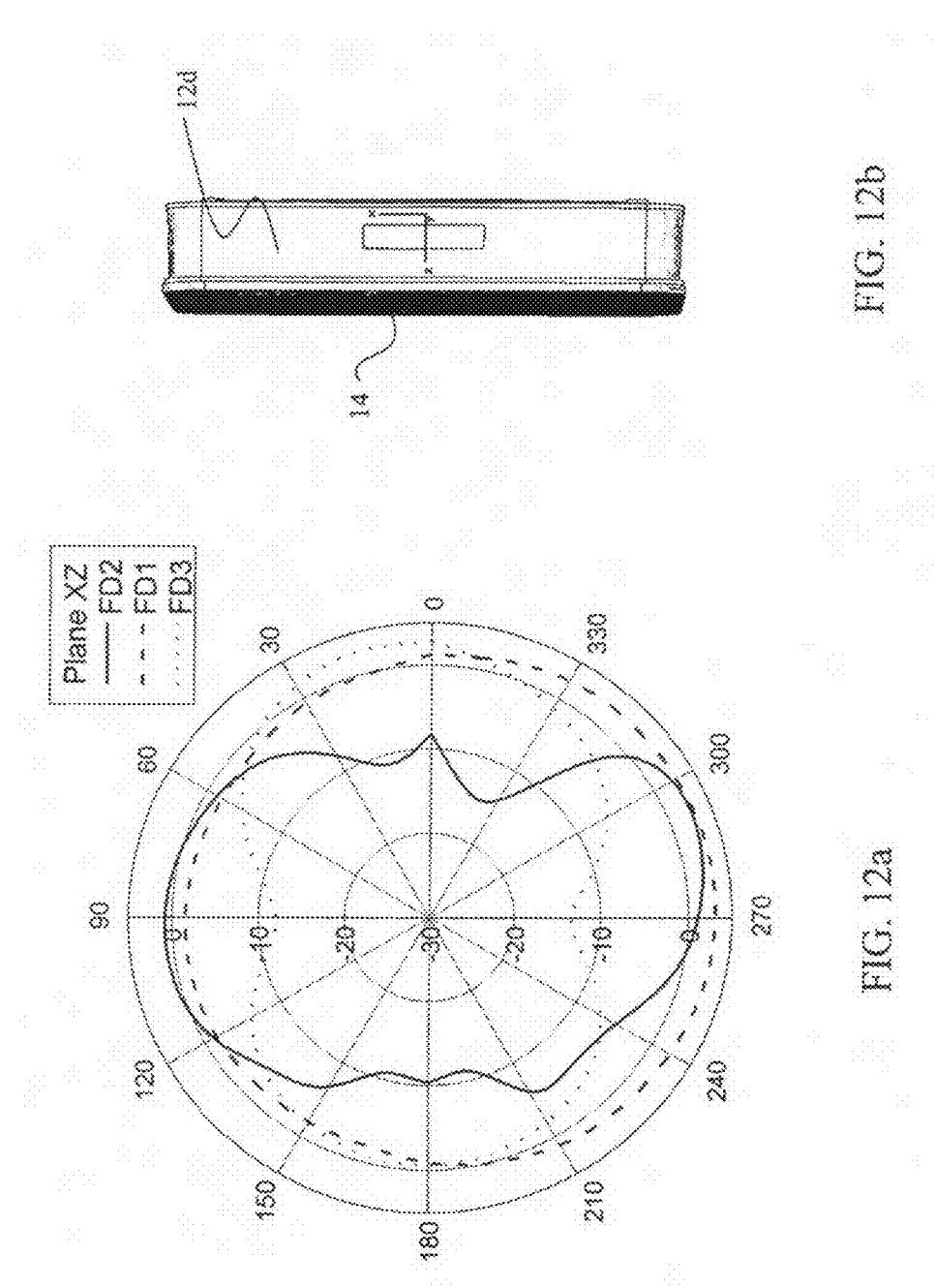
Figures 13A, 13B:
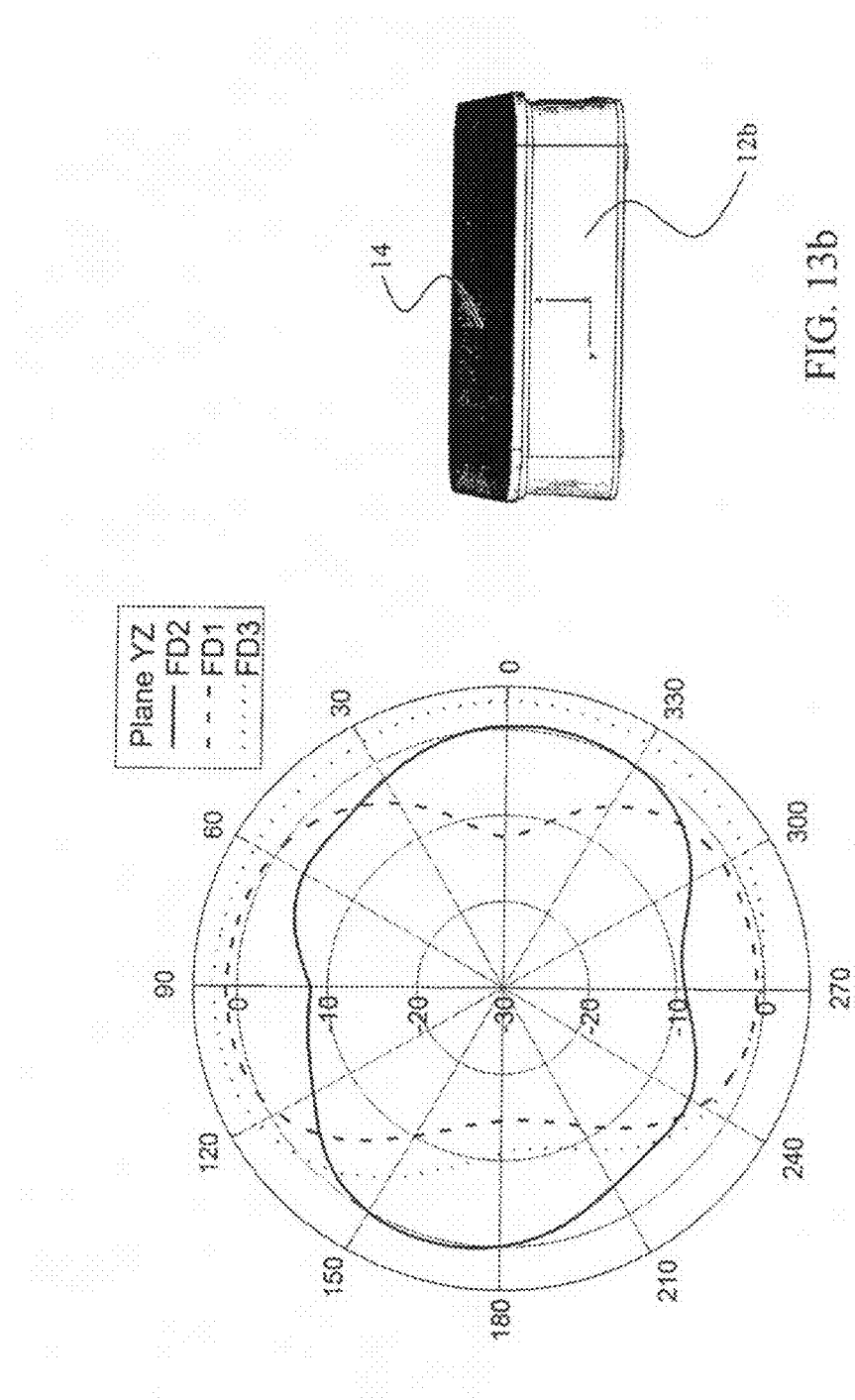
FIG. 13a show the far field gain patterns in an yz plane of the antenna system of FIG. 7 obtained from computer simulations. The orientation of the gateway in the simulations of the pattern of FIG. 13a is schematically illustrated in FIG. 13b.

FIGS. 11a, 12a and 13a reports computer simulations of the co-polar far field gain patterns along three principal planes for an AG according to the embodiment shown FIG. 7 and having an antenna system with printed dipole antennas of the type shown in FIGS. 5 and 6 and operating at 2.45 GHz. Dashed line represents the gain pattern of the horizontally oriented antenna, i.e., first antenna 22 (indicated in the diagrams with FD1), solid line represent the gain pattern of the vertically oriented antenna, i.e., second antenna 23 (indicated in the diagram with FD2), whereas dotted line represent the gain pattern of the third antenna 20 (indicated in the diagram with FD3). In particular, FIG. 11a shows the radiation pattern simulated with the AG housing horizontally positioned along the (x,y) plane in a typical orientation with the bottom wall being the base on which the AG rests, as schematically illustrated in FIG. 11b.

FIG. 12a shows the radiation pattern simulated in a plane parallel to the front wall 12d and with the AG housing vertically positioned and resting in a plane perpendicular to the bottom wall 13 (and cover 14), i.e., the (x,z) plane, as schematically illustrated in FIG. 12b.

FIG. 13a plots the radiation diagram simulated with the AG housing horizontally positioned in a plane parallel to the side wall 12b, as schematically illustrated in FIG. 13b.

Simulation results show that the combined radiation patterns of the antennas 20, 22 and 23 in the three main planes are substantially omni-directional with the ripple not exceeding 5 dB in more than 90% of the round angle in the three main planes on which the simulations of FIGS. 11a, 12a and 13a were carried out.

Although the present invention has been disclosed and described by way of some embodiments, it is apparent to those skilled in the art that several modifications to the described embodiments, as well as other embodiments of the present invention are possible without departing from the essential features thereof/the scope thereof as defined in the appended claims.

The invention claimed is:

1. A wireless access gateway for communication of wave signals at radio frequencies within a frequency band, the gateway being enclosed in a housing comprising a bottom wall defining a base plane and comprising:
 a main circuit board within the housing overlying said bottom wall and having an upper surface and a lower surface, opposite to each other, said lower surface facing the bottom wall and said upper surface being substantially parallel to the base plane, and
 an antenna system arranged in the housing and comprising:
 a first linearly polarized antenna for propagating a first wave signal along a first polarization axis, the first antenna comprising a first radiating element extending along a first longitudinal axis in a first plane substantially parallel to the base plane, the first radiating element being placed laterally and external to the main circuit board with the first plane at a distance of not more than $\lambda/4$ from the upper surface of the main circuit board in a direction perpendicular to the first plane; and
 a second linearly polarized antenna for propagating a second wave signal along a second polarization axis oriented perpendicularly to the first polarization axis, the second antenna being placed laterally and external to the main circuit board and comprising a second radiating element extending along a second longitudinal axis in a second plane oriented perpendicularly to the first plane, wherein
 the first and second antennas are connected through the main circuit board to a diversity receiving circuit, and
 the first and second antennas are positioned relative to each other at a distance of at least $\lambda/2$ in a direction perpendicular to the first and second longitudinal axes, where $\lambda$ is the wavelength corresponding to a radio frequency within the frequency band.

2. The gateway of claim 1, wherein the first antenna is substantially planar with the first radiating element disposed on an upper surface of a first planar substrate, said upper surface defining the first plane and wherein the second antenna is substantially planar with the second radiating element disposed on an upper surface of a second planar substrate, said upper surface defining the second plane so that the first and second planar substrates are oriented perpendicularly one to another.

3. The gateway of claim 2, wherein the first and second planar substrates are made of dielectric material.

4. The gateway of claim 3, wherein the first and second antennas are printed antennas having the first radiating element printed on the first planar substrate and the second radiating element printed on the second planar substrate.

5. The gateway of claim 1, wherein the first and second longitudinal axes correspond to the first and second polarization axes, respectively.

6. The gateway of claim 1, wherein the first and second antennas are positioned relative to each other at a distance of at least $2/3\lambda$.

7. The gateway of claim 1, wherein said distance of the first plane from the upper surface of the main circuit board is not more than $\lambda/8$.

8. The gateway of claim 1, wherein said distance of the first plane from the upper surface of the main circuit board is not more than 5 mm.

9. The gateway of claim 1, wherein the first and the second antennas are electrically connected to the main circuit board.

10. The gateway of claim 1, wherein the housing comprises a peripheral enclosure formed by opposed side walls, a front wall and a rear wall.

11. The gateway of claim 10, wherein at least one of the opposed side walls is substantially perpendicular to the bottom wall and the second longitudinal axis lying on the second plane is arranged substantially parallel to at least one of said side walls.

12. The gateway of claim 10, further comprising at least one connector mounted in the housing and accessible from exterior the access gateway through the rear wall.

13. The gateway of claim 12, wherein each of the first and second antennas is spatially separated from an outer edge of at least one connector at a distance in the direction of the first longitudinal axis of at least $\lambda/2$.

14. The gateway of claim 12, wherein each of the first and second antennas is spatially separated from the outer edge of the at least one connector at a distance in the direction of the first longitudinal axis of at least $\lambda$.

15. The gateway of claim 1, wherein the antenna system comprises two and not more than two antennas.

16. The gateway of claim 1, wherein a radiation pattern of each of the first and second antennas is substantially omni-directional in a main plane orthogonal to the longitudinal axis of each of the first and second antennas, respectively.

17. The gateway of claim 1, wherein each of the first and second antennas is a dipole antenna.

18. The gateway of claim 17, wherein each of the first and second antennas has a dipole center disposed substantially centrally of the radiating element along the longitudinal axis, the dipole center of the first antenna being spatially separated from the dipole center of the second antenna at a distance of not more than $\lambda/4$ along the first longitudinal axis.

19. The gateway of claim 1, wherein the antenna system further comprises a third linearly polarized antenna for propagating a third wave signal along a third polarization axis oriented perpendicularly to the first and second polarization axes, the third antenna comprising a third radiating element extending along a third longitudinal axis lying on a third plane.

20. The gateway of claim 19, wherein the third plane is oriented substantially parallel to the base plane of the bottom wall of the housing.

21. The gateway of claim 20, wherein the third plane is placed at a distance in a direction perpendicular to the third plane of not more than $\lambda/4$ from the upper surface of the main circuit board.

22. The gateway of claim 21, wherein said distance of the third plane from the upper surface of the main circuit board is not more than $\lambda/8$.

23. The gateway of claim 21, wherein said distance of the third plane from the upper surface of the main circuit board is not more than 5 mm.

24. The gateway of claim 19, wherein the third antenna is substantially planar with the third radiating element disposed on an upper surface of a third planar substrate, said upper surface defining the third plane.

25. The gateway of claim 24, wherein the third planar substrate comprises dielectric material.

26. The gateway of claim 25, wherein the third antenna is a printed antenna having the third radiating element printed on the third planar substrate.

27. The gateway of claim 19, wherein the third plane is oriented substantially in co-planarity with the first plane on which the first radiating element of the first antenna lies.

28. The gateway of claim 19, wherein the third antenna and the first antenna are positioned relative to each other at a distance of at least $\lambda/2$ and the third antenna and the second antenna are positioned relative to each other at a distance of at least $\lambda/2$.

29. The gateway of claim 28, wherein the first antenna and the second antenna are positioned relative to each other at a distance of at least $\lambda$.

30. The gateway of claim 19, wherein a radiation pattern of the third antenna is substantially omni-directional in a main plane orthogonal to the third longitudinal axis.

31. The gateway of claim 19, wherein the third antenna is a dipole antenna.

32. The gateway of claim 19, wherein the third longitudinal axis corresponds to the third polarization axis.

33. The gateway of claim 19, wherein the antenna system comprises three and not more than three antennas.

* * * * *